Oct. 10, 1972  E. T. STRICKLAND ET AL  3,697,241
METHOD AND APPARATUS FOR PROVIDING CONTROLLED QUENCH
IN THE MANUFACTURE OF FIBER GLASS
Filed Jan. 14, 1969  4 Sheets-Sheet 1
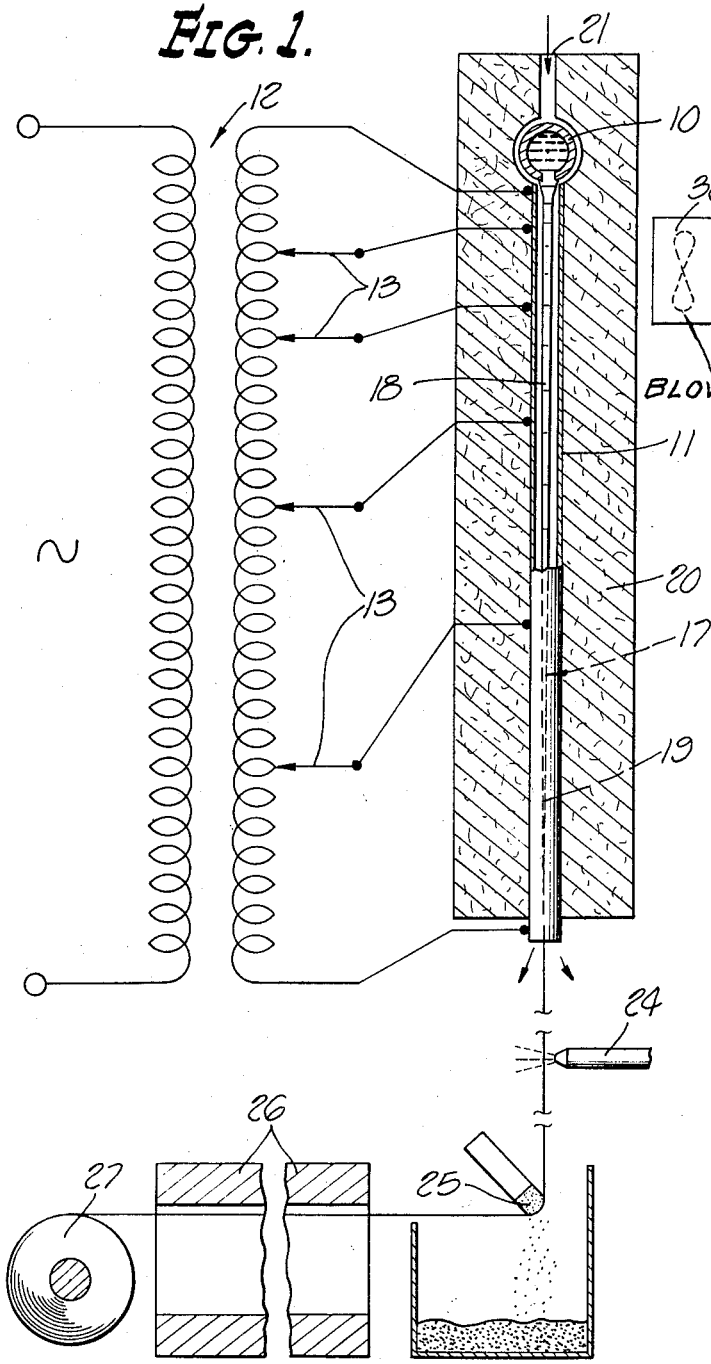
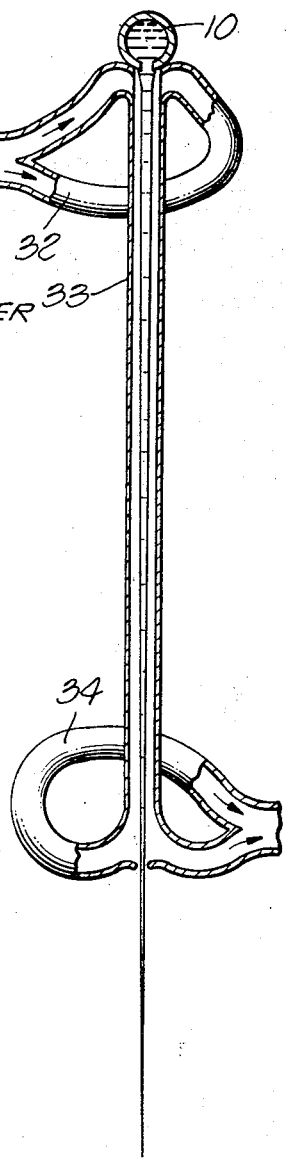
INVENTORS.
EDWARD T. STRICKLAND
HOMER C. AMOS
BY
*Lyon & Lyon*
ATTORNEYS Oct. 10, 1972   E. T. STRICKLAND ET AL   3,697,241
METHOD AND APPARATUS FOR PROVIDING CONTROLLED QUENCH
IN THE MANUFACTURE OF FIBER GLASS
Filed Jan. 14, 1969   4 Sheets-Sheet 2
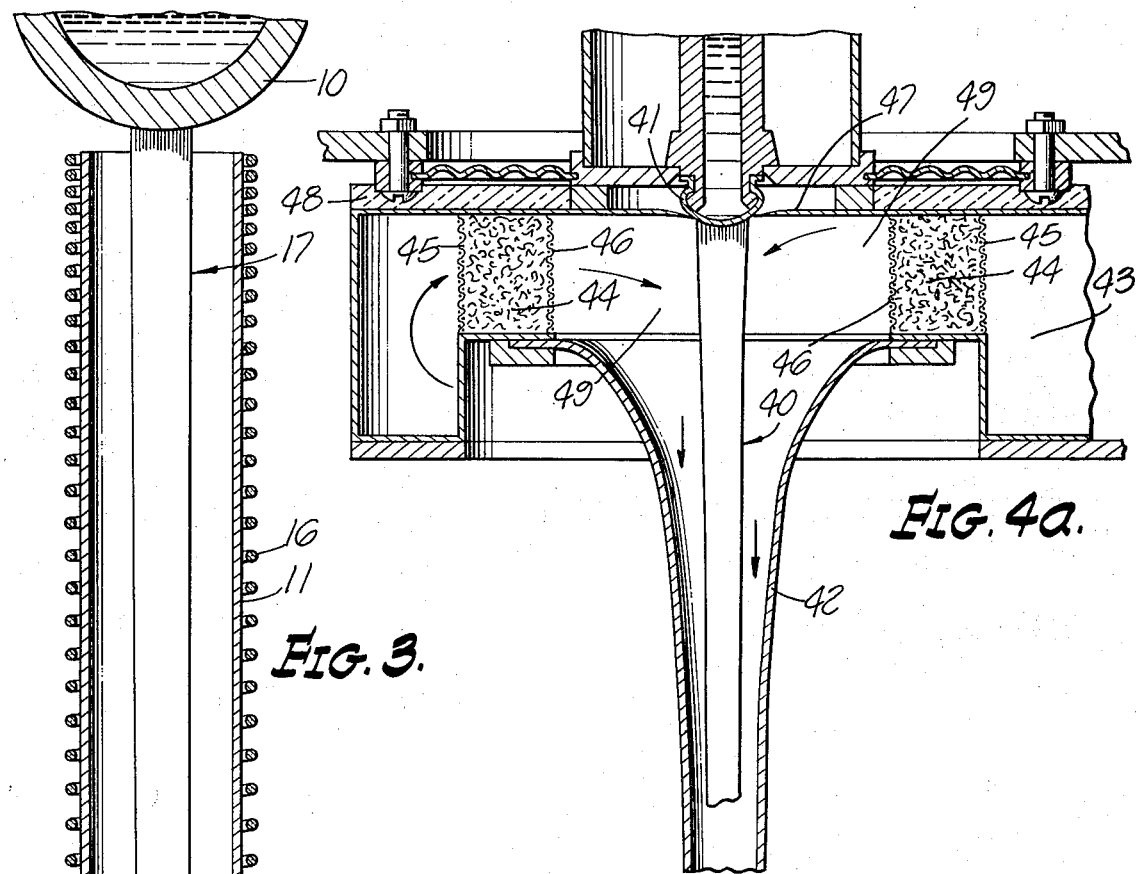
FIG. 3.
FIG. 4a.
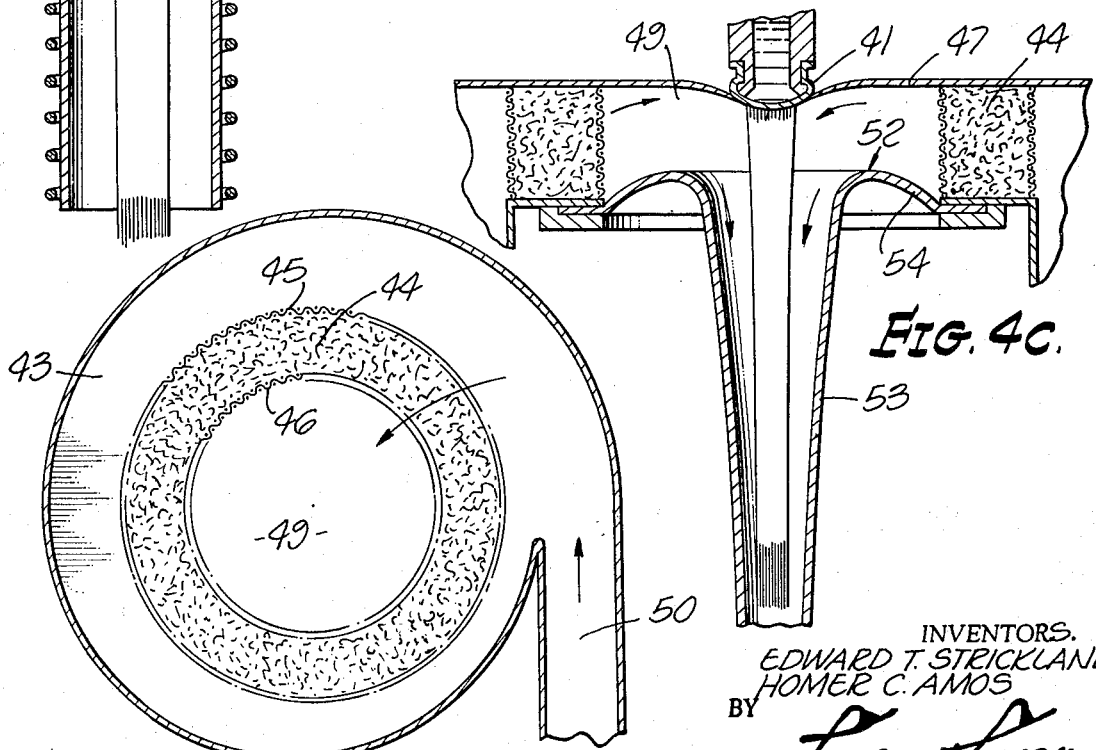
FIG. 4b.
FIG. 4c.
INVENTORS.
EDWARD T. STRICKLAND
HOMER C. AMOS
BY
Lyon Lyon
ATTORNEYS

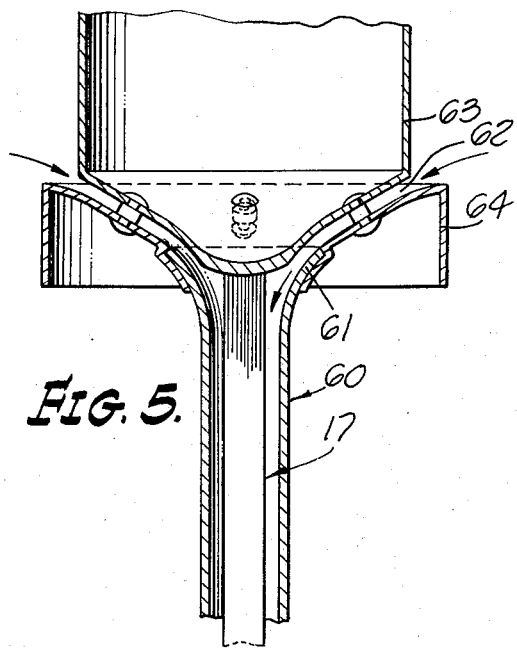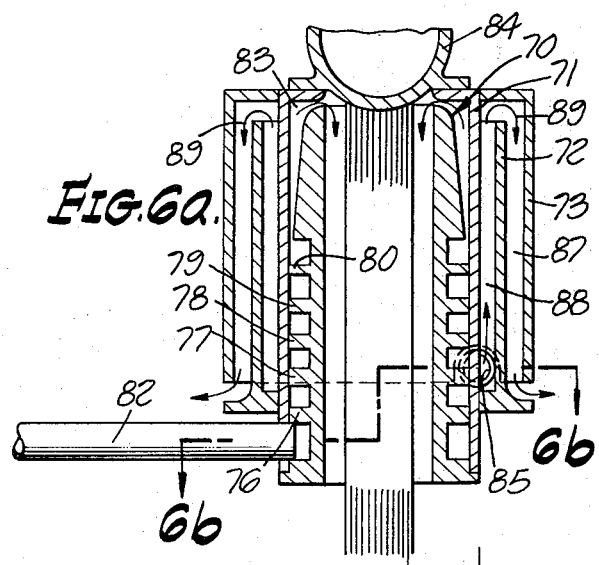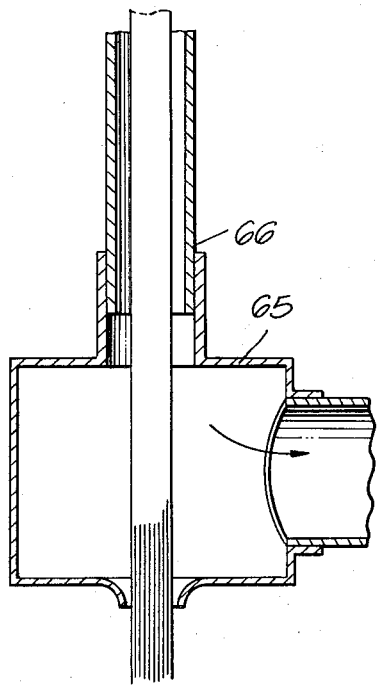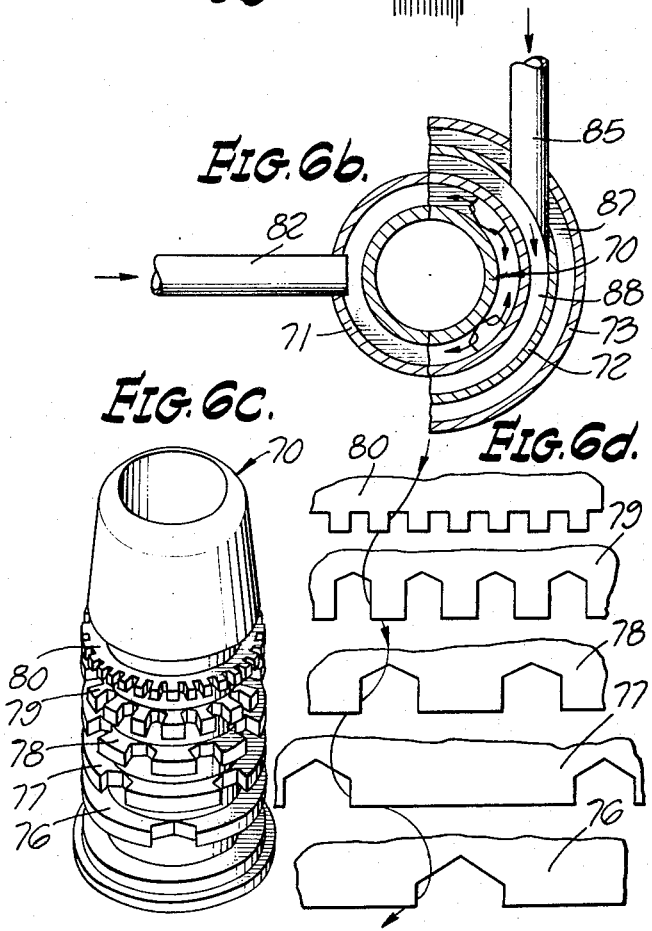

Oct. 10, 1972  E. T. STRICKLAND ET AL  3,697,241
METHOD AND APPARATUS FOR PROVIDING CONTROLLED QUENCH
IN THE MANUFACTURE OF FIBER GLASS
Filed Jan. 14, 1969  4 Sheets-Sheet 4
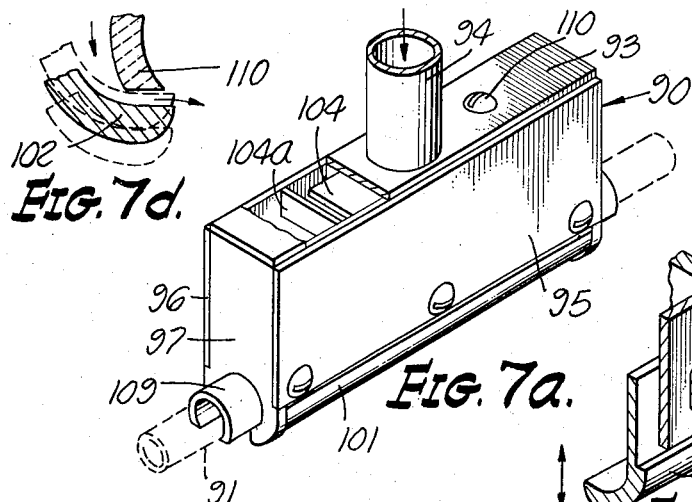
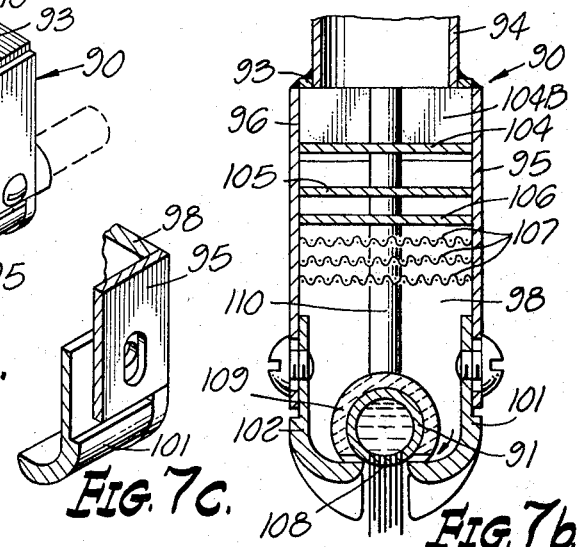
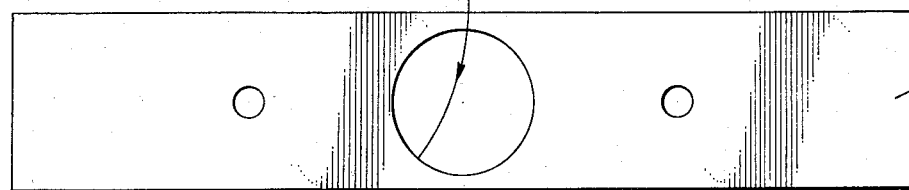
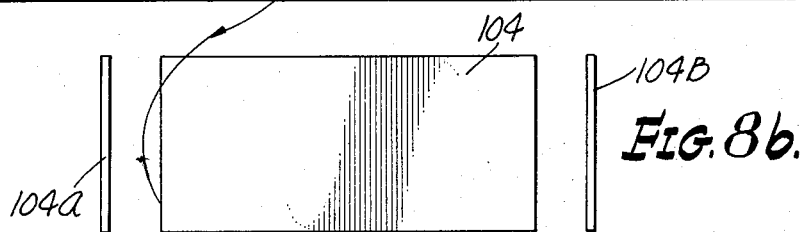
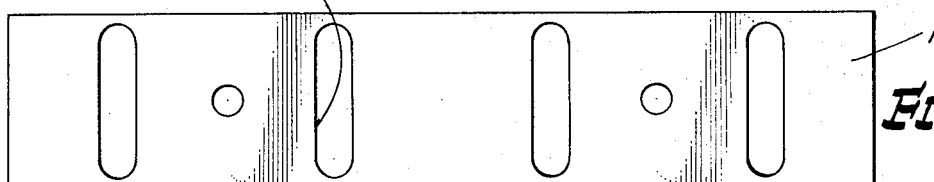
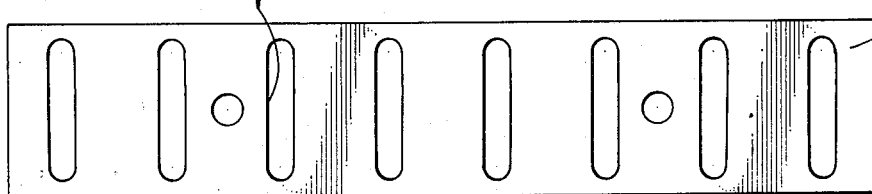
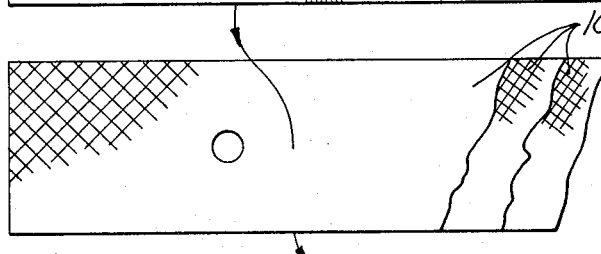
INVENTORS.
EDWARD T. STRICKLAND
HOMER C. AMOS
BY
Lyon & Lyon
ATTORNEYS

United States Patent Office 3,697,241
Patented Oct. 10, 1972

3,697,241
METHOD AND APPARATUS FOR PROVIDING CONTROLLED QUENCH IN THE MANUFACTURE OF FIBER GLASS
Edward T. Strickland and Homer C. Amos, Palm Springs, Calif., assignors to PPG Industries, Inc., Pittsburgh, Pa.
Filed Jan. 14, 1969, Ser. No. 790,933
Int. Cl. C03b 37/02
U.S. Cl. 65—2
14 Claims

ABSTRACT OF THE DISCLOSURE

Disclosed herein are methods and apparatus for controlling the quench of glass fibers as they are extruded. A fluid, such as air, is caused to flow evenly with controlled impingement at the roots of fibers as they are being extruded from a bushing, and/or a controlled temperature environment is provided along the extruding cone of fibers. With either or both approaches small fibers with greatly reduced breakage can be produced. Several embodiments of the present concepts are disclosed wherein a manifold device is used at the bushing to provide a controlled even flow of air at the roots of the extruding fibers, and wherein a chamber may be used along a length of the drawn fibers to provide a controlled environment and to reduce the stress in such fibers during attenuation.

CROSS-REFERENCE TO RELATED APPLICATIONS

The present invention relates to, and is an improvement over, applicants' copending application Ser. No. 556,800, filed May 13, 1966, entitled "Apparatus and Process for Extruding Fibers," now abandoned in favor of continuation application Ser. No. 3,558, now Pat. No. 3,573,014, the disclosure of which is incorporated herein by reference. Additionally, a related application is applicants' copending application Ser. No. 759,736, filed Sept. 13, 1968, entitled "Bushing for Use in Extruding Fibers," now Pat. No. 3,574,581, the disclosure of which is incorporated herein by reference.

BACKGROUND OF THE INVENTION

This invention relates to the manufacture of glass fibers, and more particularly to methods and apparatus for controlling the environment as such fibers are extruded and attenuated.

Fibers and filaments are produced from many substances, and in recent years there has been considerable activity in the production of filaments from glass to produce fiber glass. Fiber glass has many uses including insulation, yarn, glass reinforced plastic, and so forth. In the production of fiber glass, molten glass typically flows through nozzles or tips in a "bushing" resulting in fibers or filaments which then are cooled and drawn onto a winding reel or forming tube. The equipment for melting the glass, headers or manifolds for feeding the molten glass to the bushings, the bushings, and associated equipment are massive in size. Elaborate temperature control and insulation are utilized to maintain the bushings at a precise temperature. The bushings and headers are made from expensive materials, such as platinum.

As a result of the extreme coalescing characteristic of liquid glass, conventional fiber glass forming equipment utilizes bushings having large, complex, individually fabricated and widely spaced orifice nipples to obtain the necessary separation of the drawn fibers. A proposal was made as set forth in British Pat. No. 763,160 to use tiny orifices in a bushing formed of a low wettability material. However, the particular approach described therein suffers from many deficiencies.

Usually, each bushing provides one end of roving, that is, 204 fibers or filaments. Several filaments generally break during each run of one pound of glass, and when a filament breaks a large drop of glass forms. If the orifices are spaced close enough this drop touches other filaments, and neighboring filaments likewise are broken in a rapidly widening ring. The orifices must be spaced widely enough to prevent this occurrence. When a one pound run is finished and the drawing process has ceased, the next run starts anew with a full compliment of 204 filaments. This is accomplished by allowing a waiting period during which time a drop is formed at each nozzle by the oozing glass, and the filaments are pulled by the operation so that each drop is forced to weld to the neighboring drops so that the filaments broken during the previous run will be caught and restarted. Accordingly, it is generally required that spacing between the orifices be more than the radius of a drop but less than the diameter of a drop.

It is well known that the viscosity of glass at and near fiber forming temperatures changes rapidly with slight changes in temperature. When flowing glass is cooled somewhere along its flow path, channeling of the flow results unless great care is exercised to maintain temperature uniformity. The highly unstable channeling characteristic of flowing glass causes serious flow rate variations. The hotter and lower viscosity glass begins to flow faster carrying more and more heat to its point of egress, while the cooler and slower flowing glass cools off more and becomes even slower in its flow rate. Such instability cycles are untenable in drawing glass fibers. A certain amount of flow rate instability is inherent in the bushing assembly design in conventional filament drawing equipment. This instability results from irregularities in the shape of nipples, in the heating current path of the bushing and in the bushing insulation which cause irregularities in loss of heat energy through radiation and convection and gain of heat energy through resistance heating. The surface areas of the bushing are so large that insulation is required wherever possible to prevent excessive total heat loss, and this in turn causes local temperature increases. However, the total orifice area cannot be insulated and is exposed to the lower temperatures of the room in which the equipment is operating. Consequently, this area suffers considerably greater energy losses than elsewhere in the overall system. The higher glass temperature in the insulated area and the lower temperature of the glass in the orifice area results in localized temperature differences which in turn cause glass flow irregularities through the nozzles, as well as cause channeling which further aggravates the problem.

Accordingly, conventional production facilities for producing fiber glass on such apparatus require careful and precise temperature control. Great care is exercised through the use of multiple thermocouple temperature sensing probes controlling current regulators which in turn control the current to the bushings to provide an average temperature generally suitable for fiber forming. In spite of careful temperature control, the residual deficiency of the apparatus still results in a certain rate of fiber breakage. Additionally, glass is to a large extent pulled out of the orifice by the drawing tension of the conventional systems, and since this tension is markedly affected by small variations in the external environment, filament uniformity is adversely affected and breakage occurs.

It is apparent to those skilled in the art that with the conventional approaches to glass fiber formation, even with relatively large fibers, there are frequent fiber breakages during manufacture. When a break occurs, a chain reaction quickly follows which rapidly immobilizes the output from the entire bushing. Because of the frequent breakages, the fibers generally are prewound on a small cake or spool before being rewound in a much larger shipping package. Obviously, this double handling is costly and could be almost entirely eliminated if little or no breakage occurred. Also, the costs of restarting and down time is substantial.

During the past few years there has been a trend towards smaller fibers as well as toward bushings containing a greatly increased number of orifices. This has compounded the problem of breakage because smaller filaments are not only proportionately more sensitive but also the statistical change of breakage increases proportionally with the number of orifices in a bushing as well. That is, twice the number of orifices, for instance, results in half the average running time before a breakage occurs, and this multiplied by one-half if the filament is twice as sensitive results in one-fourth the running time. Also during the past few years, it has become increasingly apparent that fine and ultra fine fibers (e.g., five microns and below) have a potentially huge market, especially in the textile industry, provided that the glass fibers can be manufactured competitively with the organic yarns. A number of problems arise, however, that cause an increase in manufacturing costs problems which must be solved before the fiber glass manufacturer can compete. Factory costs are generally based on a pound per hour rate per bushing. A bushing containing 200 orifices, producing ten micron fibers, for instance, being attenuated at the peak windup speed of 13,000 to 14,000 feet per minute will produce 25 to 30 pounds per hour of fiber glass. In order for a five micron fiber to command a price somewhere near the ten micron fiber price, the poundage production rate thereof must be matched and, therefore, it would either have to be attenuated at four times the speed, approximately 56,000 feet per minute, or be pulled from a bushing containing 800 orifices. The speed of take-up was the most logical and direct way to increase production rates, and developments have been made in this area. The 13,000 to 14,000 feet per minute is the direct result of this effort; however, higher speeds do not seem practical. Thus, it has been necessary to increase the number of orifices per bushing, but inherent to this approach, on present equipment, are certain definite bushing size limiting factors.

Many of the aforementioned problems can be obviated by following the teachings of said copending application entitled "Apparatus and Process for Extruding Fibers," which describes, inter alia, the substantial miniaturization of bushings and the substantial increase in number of orifices per given bushing area. In an exemplary embodiment disclosed therein a high temperature meltable material such as glass is heated to a temperature at which it becomes liquid, and is forced by a relatively high pressure into a bushing having a plurality of closely grouped simple and tiny passages or orifices to thereby cause extrusion of the material as fibers or filaments through the orifices, and to cause and maintain proper separation of the fibers. A typical bushing is in the form of a simple tube. Glass may be heated in a furnace and pumped or otherwise forced into the bushing, or solid glass may be forced into the bushing which is at a temperature sufficient to melt the glass. A typical bushing according to said application may include 204 closely grouped orifices within an area of a small fraction of an inch for extruding 204 filaments to provide one end of roving; and much greater numbers of orifices can be provided in a small area.

The second major problem to be encountered in the reduction of fiber diameters is that the smaller the fiber, the greater is its sensitivity to breakage. A fiber breaks, of course, when the pull of attenuation exceeds its tensile strength. Large glass filaments often vary 300 percent to 400 percent in diameter, but because the nominal fiber diameter is so large even with the 400 percent reduction in size, the smallest fiber still retains sufficient cross section to withstand the tension of attenuation. Nominally small fibers are not so forgiving for they cannot tolerate large percentage variations in cross section. The two major causes of fiber diameter variations are: glass temperature variations within the bushing itself which oftentimes are as much as 100° F. (some glass flows from cold, unheated corners while other glass flows in direct contact with hot resistance heated parts of the bushing). The other main cause of size variation is the variation in the quench temperature which in the present state of the art is quite extreme. Such quench systems are subject to the slightest environmental disturbances of the air within the vicinity of the bushing. Controlling the quench rate of molten glass as it is being extruded from a single orifice is fairly simple; however, an identical quench for each fiber in a bushing which contains a multiplicity of orifices becomes quite a different problem.

SUMMARY OF THE INVENTION

The present invention solves this latter problem by controlling the air flow and air temperature so as to quench in an identical manner each filament by essentially overwhelming its air environment. Eddy currents, vortices and wind puffs and their attendant sudden and violent quenching effects are obviated. The quench environment is stabilized and controlled in such a manner as to minimize even the secondary quench effect of radiation or, if desired, the effect of radiation losses can be eliminated.

The present invention, while involving the concept of permitting the control of a wide range of quenching conditions, also facilitates setting of that degree of control compatible with the product requirements in order to meet cost demands. If, on the other hand, the market permits a noncompetitive selling price which is high enough so the manufacturer is satisfied with his profit, then the simplest of techniques disclosed herein can be applied. On the other hand, as competition increases or the manufacture of smaller fibers becomes more difficult, the manufacturer will be enabled to increase the perfection of his equipment in accordance with the concepts disclosed herein, ultimately to substantially eliminate production halts entirely, to manufacture almost any size filament, and to utilize bushings containing thousands of orifices.

Accordingly it is a principal object of the present invention to provide a new method of controllably quenching glass fibers.

Another object of this invention is to provide apparatus for controllably quenching glass fibers.

A further object of this invention is to make possible the uninterrupted production of continuous fibers below five microns in diameter.

Another object of this invention is to enable the stresses in attenuating glass fibers to be reduced.

A further object of this invention is to enable glass fibers breakage to be substantially reduced.

A still further object of this invention is to facilitate glass fiber separation.

A still further object of this invention is to enable automatic restarting upon the occurrence of fiber breakage.

Another object of this invention is to enable controlled impingement of air at the root of glass fibers as the same are being extruded.

Another object of this invention is to enable the stresses in extruding glass fibers to be reduced.

A further object of this invention is to facilitate the use of a controlled atmosphere in the extrusion of glass fibers so as to enable the use of exotic bushing materials and the use of various quenching fluids.

BRIEF DESCRIPTION OF THE DRAWINGS

These and other objects and features of the present invention will become more apparent upon reference to the following description taken with the drawings in which:

FIG. 1 is a simplified cross-sectional view of apparatus according to the present invention for providing a controlled environment during extrusion of glass fibers;

FIG. 2 is a simplified view of another form of apparatus according to the concepts of the present invention wherein a source of forced air is used;

FIG. 3 is a partial cross-sectional view of modified apparatus similar to that shown in FIG. 1;

FIGS. 4a and 4b are respectively a side elevational and top view of a form of apparatus similar to that shown in FIG. 2;

FIG. 4c is a side view of modified apparatus similar to that shown in FIG. 4a;

FIG. 5 illustrates in elevation another form of apparatus similar to that shown in FIG. 2;

FIGS. 6a through 6d illustrate a manifold apparatus for providing an even and controlled impingement flow of air at the orifice area of a circular bushing; and FIGS. 7a through 7d and FIGS. 8a through 8e illustrate another manifold apparatus for providing an even and controlled impingement flow of air at the orifice area of a tubular bushing.

DESCRIPTION OF THE PREFERRED EMBODIMENTS

Introduction

The weakest point in a fiber during forming thereof is not the low viscosity, very low stressed and comparatively gigantic base or cone, because glass with sufficient liquidity is limited in its ability to transmit loads since it reduces in cross section and thus relieves itself of stress faster than stress can build up. Nor, of course, is the weakest point found in the cold fiber, because cold fibers can withstand substantial stresses. There is, however, a critical inbetween point where the high viscosity glass can no longer stress relieve itself fast enough and, consequently, the glass must withstand more and more stress where it is not cool enough to have gained anything but a modicum of strength. At this critical point or area, the tiny, hot fiber has almost been stretched to its smallest and final diameter and has therefore almost reached its maximum stress. This highly stressed, heat weakened section of the asymptotic cone is the weak link in the fiber forming chain, and is the point where a fiber breaks unless mechanically broken elsewhere.

Through the use of the principles described in said Pat. No. 3,573,014, the stresses involved in extruding the fibers can be substantially reduced, thus reducing the stress at the critical point. According to the concepts of the present invention, most of the attenuating force is essentially applied directly to the cone of the extruding fiber, therefore further substantially reducing the stress at the critical point or area. Basically, the objects of the present invention are accomplished by controlling the environment about the fiber as it is being extruded. Such control may be exercised in two areas, viz (1) by the application of a controlled evenly distributed flow of air at the root (base of the cone) of each of the fibers being extruded, and (2) through environmental temperature control of the fiber all along the asymptotic cone from the root to a point somewhere past the critical area. Typically, a blast of hot gas is presently used in the trade to attenuate glass into fibers; however, breaks occur with great frequency and even though automatic restarting occurs, each short fiber has attached to itself a ball or shot of glass making it useful only for insulation. Through the practice of the concepts of the present invention, continuous filaments can be readily produced which are usable for yarns and textile purposes.

Before describing the details of this invention, it should be noted that there are at least three methods of applying load to the cone, and these may be termed the gravity method, the air pull method, and the tension method. In the present invention pure gravity pull, pure air pull, pure tension pull, or a combination of two or all three may be applied. The degree of permissible tension is determined by the stress sensitivity of the filament; i.e., the smaller the filament, a greater portion of gravity pull or air pull as verses tension pull is required than with the relatively insensitive larger filaments where the attenuating forces can be virtually full tension. Practice of the concepts of the present invention substantially reduce size variations in the filaments from the 400% found in existing methods to less than 10% variation, because environmental gravities are completely overwhelmed so as to reduce breakage virtually to zero.

In the gravity method, the weight of the cone itself essentially does the pulling; whereas, in the air pull method a rapidly moving current of air produces a downward pull on the cone. With either method, there may be a certain minimum pull as a result of the tension of the wind-up apparatus but this is relatively low.

In both latter methods of pull (air and gravity), the load is cumulative over the full length of the cone and the stress is almost constant thereover. At the bottom of the cone in the critical area where the diameter is very small, the applied load is very small since the load results ideally only from the weight, or the air drag, on that portion of the fiber below this point. Higher in the cone, as the load cumulatively increases, the diameter of the cone also proportionally increases to maintain an almost constant stress throughout.

Each method of pull has its advantages. The gravity system is, of course, the simpler; however, unless the temperature of the extruded fiber is carefully controlled, cycling will occur, i.e., variation in the mass of the cone. The rate of deformation increases near the base of the cone (near the orifice), but the insufficiently attenuated section preceding this point forms a bulge in the cone and creates pinch-off near the orifice. While the bulge is still in the cone, the pull is too great and too much attenuation occurs. As the bulge passes from the cone and its weight is no longer effective, then the pull is insufficient, undershoot occurs, and this unstable cycle repeats.

According to the present invention, this cycling can be prevented by introducing a temperature differential which is highest near the orifice area and lowest near the bottom of the cone. This prevents cycling by making deformation easier near the orifice. Since viscosity increases with decreasing temperatures, this approach tends to prevent excessive attenuation as the incipient pinch-off travels downward. If the heated section is short, a uniform temperature somewhat above the annealing temperature of the glass will suffice to create a differential in the cone. If the heated section is very long, then it is helpful to control the temperature in zones hotter near the orifice area and cooler near the lower end of the cone.

The air pull technique has the disadvantage that a smooth and rapidly moving stream of hot air is required. It has the advantage of being almost without tendency of cycling and requires a shorter heated length to produce the same low load at the critical point. It has the advantage of self-restarting inasmuch as when breakage occurs, the full length of the cone remains, and its weight along with the air drag continues the attenuation. The free end of the broken cone is caught by other filaments, and the long cone then takes up the shock causing the fiber to be quickly picked up and restarted without forming a slug or shot.

The controlled introduction of air at the root of the cone aids in obtaining separation, and allows the glass pressure normally required to be reduced while still obtaining and maintaining separation. In addition, this, as well as the very low forming loads which cause extremely low forming tension, the present concepts also facilitate self-restarting. The air introduced at the root of the fibers can be controlled in temperature as well as the rate of flow thereof. Hotter air results in a slower quench rate by causing an increase in the length of the forming cone. This results in a decrease of the pull force required for attenuation which is generally proportional to the forming cone length. Should a fiber break, it will break at the critical point near the end of the forming cone which in the practice of the present invention thus may be several feet long because of the slower quench and low forming tension. The hot, high speed air or gravity pull is sufficient to overcome the surface tension of the molten fibers and their tendency to ball-up, and causes the broken fiber to continue to attenuate without interruption.

Turning now to the drawings, FIG. 1 illustrates a gravity pull system employing a bushing 10. The bushing 10 has a plurality of simple, tiny and closely spaced orifices, and the glass therein may be under relatively high pressure in accordance with the principles set forth in said Pat. No. 3,573,014. The glass is extruded from the bushing 10 and passes through a chamber 11 which may be in the form of a tube. The chamber 11 may be formed of metal and may itself serve as a heating element by means of current passed therethrough from a transformer 12. Suitable taps 13 are provided on the secondary winding of the transformer, and are electrically connected along the tube 11 as shown to provide zone control of the temperature of the tube. Alternatively, the thickness of the wall of the tube 11 could be varied such that different areas are heated to different temperatures, or a winding of resistance wire 16 may be applied about the tube 11 as seen in FIG. 3 and the wire directly energized. Any of these arrangements serves to provide a controlled temperature zone along the extruding fiber 17 to control the temperature along the cone 18 thereof and past the critical area 19. The temperature varies from a high value near the bushing down to a lower value near the lower end of the chamber 11. It will be noted that the spacing of the turns of the winding 16 may vary as shown in FIG. 3 to accomplish the temperature variation. An example winding is formed as shown of fifteen feet of one-sixteenth inch diameter resistance heated platinum wire wound on a chamber 11 approximately six inches long and one and one-eighth inch in diameter to provide a variable temperature zone from approximately 2100° F. to approximately 1200° F.

Insulation 20 may be provided about the tube and bushing. An air inlet 21 may be used to provide a suitable air flow, if desired, or to provide a gentle flow of an inert gas such as nitrogen or argon to provide protection for any exotic, oxidizable bushing material that may be used. The air or gas may be heated if desired, and the path thereof may be in a closed loop so as to substantially eliminate the loss thereof.

After attenuation of the fiber 17, in the case of a roving of several filaments up to several thousands, sizing is sprayed on the fibers by suitable spraying apparatus 24, the excess being wiped off by centrifugal force at a graphite bearing 25. The fibers then travel through a drying oven 26 and are wound on a winder 27 as a final shipping package. Although the preceding discussion has referred to a fiber, it is to be understood that a plurality of fibers, such as a twelve thousand filament roving, can be extruded from the bushing 10 through the controlled environment provided by the structure shown in FIG. 1.

Alternatively, when the tube 11 is relatively short the inner surface thereof may be made highly reflective. This allows heat radiated from the fiber to be reflected back to the fiber in order to gently quench the same thereby creating a result similar to a mildly heated tube.

An embodiment employing air pull is illustrated in FIG. 2. Air from a blower 30 passes through a heater 31, and into a manifold 32. The manifold is coupled to a chamber 33 in the form of a tube below the orifice area of the bushing 10 and at the root of the extruding fibers. Air travels past the fibers gently quenching the same, and travels down the tube 33 to attenuate the fibers, ultimately passing out through an exhaust manifold 34. The air may be returned to the blower 30 or used for some preheating application in the fiber forming process.

A more detailed embodiment of the apparatus of FIG. 2 is illustrated in FIGS. 4a and 4b. Here, fibers 40 are extruded from a circular bushing 41 through a configured chamber 42 which may be formed, for example, of quartz or material known by the name Vycor. The upper end of the chamber 42 has a configuration similar to a trumpet bell so as to allow continuous acceleration of the air passing downwardly therethrough such that the air always moves faster than the fibers 40 to exert a pull thereon and to prevent turbulence. The air is introduced from a circular manifold 43 through a ring of metallic wool 44 supported by cylindrical sections 45 and 46 of fine mesh screening. The metallic wool 44 provides a pressure drop and an even laminar flow of the air into the upper end of the tube 42. A cover plate 47 and insulation 48 provide a seal at the bushing 41 to enclose the upper end of the tube 42, and serve to define therewith a quench chamber 49. Air is introduced into the manifold 43 at 50, and it will be apparent from a consideration of FIG. 4b that the air flows radially inwardly toward the extruding fibers 40.

Preferably, the temperature of the air in the quench chamber 49 at the root of the cones of the fibers 40 is in the range between the temperature of the molten glass down to room temperature, and it will be apparent that the specific temperature depends upon the particular fiber forming requirements, such as rate of attenuation, number of fibers being formed, desired cone length for minimum breakage, and so forth. Typically, this temperature will range between approximately 1500° F. and a lower temperature, and even as low as room temperature under certain circumstances.

FIG. 4c illustrates another configuration for the quench chamber 49 wherein an upper end 52 of a tube 53 flares outwardly at 54 thereby providing an annular venturi-type quench chamber. This arrangement also enables tangential introduction of air to be radially oriented such that it finally enters the mouth of the tube 53 in a better laminar flow fashion. This same air flow concept can be applied to a tubular bushing, or other configurations, as well.

FIG. 5 illustrates another arrangement employing a quartz tube 60 which is also flared outwardly at the upper end 61 thereof. An annular inlet chamber 62 is provided between the lower end of the bushing manifold 63 and a bracket 64 for the tube 60 to form a fully radial air source, and to furnish a downward flow of laminar air. The bracket 64 may be supported in any suitable manner as by riveting the same to the bushing 60 or same bushing support structure. A vacuum source (not shown), such as a vacuum cleaner, can be coupled to an outlet manifold 65 at the lower end 66 of the quartz tube 60 so as to draw air into the annular inlet 62.

FIGS. 6a through 6d illustrate another form of an air manifold for a circular bushing. This manifold also provides air at an even flow and temperature at the root of the cones of the fibers. This manifold serves as a flow and temperature equalizer which may be termed a whiffle-tree type of air diffusion apparatus, and serves to provide quench air which strikes each filament with substantially equal velocity and temperature. The manifold includes a cylindrical core 70 having mounted thereon a cylindrical shell 71, an inner cylindrical jacket 72, and an outer cylindrical jacket 73. The core 70 includes a plurality of segmented rings 76 through 80 as best seen in FIGS. 6c and 6d. FIG. 6d is a diagrammatic view showing the air flow paths through the segmented rings. The first ring 76 has two slots or openings, the second ring 77 has four, the third ring 78 has eight, the fourth ring 79 has sixteen, and the fifth ring 80 has thirty-two. This arrangement allows inlet air supplied through a tube 82 to be evenly and smoothly dispersed as it egresses from the annular chamber 83 formed between the upper end of the core 70 and top of the shell 71. In addition to the even flow of air, the air impinges radially inwardly upon the root of the fiber cones immediately upon egress from the bushing 84. Heating air, if desired, can be supplied to an inlet 85 and flows in the inverted U-shaped annular chamber 87–88 as indicated by arrows 89. Preferably, the inlet tube 85 may be a resistance heated tube so as to warm the air passing into the chamber 87–88. This heated air in turn causes the air supplied to the inlet tube 82 to be heated.

In an exemplary form of the manifold illustrated in FIG. 6a, the core 70 may have a diameter at the periphery of the rings of one and one-fourth inches, a diameter at the root of rings of approximately fifteen-sixteenths inch and an overall length of two and non-sixteenths inches. The rings 76–78 may have a thickness of three thirty-seconds inch, the ring 79 one-sixteenth inch and the ring 80 one thirty-second inch. The slots in the rings may be formed by drilling with a five-sixteenth inch drill for ring 76, one-fourth inch drill for the ring 77, three-sixteenths inch drill for the ring 78, one-eighth inch drill for the ring 79, and the slot in ring 80 may be one-sixteenth inch milled slots. The cylindrical shell 71 may form a light press fit on the core 70, have a thickness of approximately one-sixteenth of an inch and a length of approximately two and nineteen thirty-seconds inches. The upper end thereof may have a three-fourths inch opening to correspond with the inside diameter of the core 70. The jacket 72 may have an inside diameter of approximately one and five-eighths inches and an outside diameter of approximately one and three-fourths inches, and have a base which forms a press fit on the lower end of the shell 71. The length of the jacket 72 is approximately two inches. The shell 73 may have an inside diameter of two inches and an outside diameter of two and one-eighth inch, and have a length of approximately two inches. The upper opening thereof forms a press fit with the upper end of the shell 71. All components may be made of stainless steel.

FIGS. 7a through 7d and 8a through 8e illustrate another form of whiffle-tree type manifold 90 for use with a tubular bushing 91. The manifold may be of welded construction, and includes a cover 93 to which an air inlet 94 is secured, upper sides 95–96 and ends 97–98. Deflector plates 101–102 are affixed to the respective upper sides 95–96 and the ends 97–98, and may be adjustable as seen in FIG. 7d to provide the desired air flow. An internal plate 104 and ribs 104a and 104b serve as an air baffle as seen in FIG. 8b to form two air passageways, and plates 105 and 106 are provided with an increasing number of apertures as best seen in FIGS. 8c and 8d. The plates 104–106 are secured to the sides 95–96. One or more layers of screening 107 as seen in FIG. 8e also are used.

The plates 104 through 106 and screening 107 provide an equal flow of air at even temperature, as well as a controlled impingement and gentle flow, all along the orifice area 108 of the bushing 91. The deflector plates 101–102 are curved as illustrated in FIGS. 7b–7d to ensure that even flow of air impinges as close as possible to the root of the cones of the fibers. Insulation 109, such as a ceramic material, preferably is provided about the bushing 91 except for the orifice area inasmuch as the quenching air typically is cooler than the bushing. The manifold may be resistance heated to heat the air.

The manifold 90 may have a length of approximately six and one-fourth inches, a width of approximately one and five-sixteenths inches and a height from the center line of the bushing 91 to the top of the manifold of two and five-sixteenth inches. The insulation 91 may have an inside diameter of approximately fifty-six hundredths of an inch so as to receive a tubular bushing, and have a lower slot width of approximately three-eighths inch so as not to interfere with egress of fibers. The baffle plate 104 may be approximately two and five-sixteenths inches long and mounted approximately three-eighths inch below the top plate of the manifold. The plate 105 is mounted approximately one-fourth inch below the baffle plate 104 and the slots therein typically are approximately one-fourth inch wide and one and one-sixteenth inch long. The plate 106 is mounted approximately one-eighth inch below the plate 105, and the slots therein typically are approximately three-sixteenths inch wide and one and one-sixteenth inch long. The insulating 109 may support the bushing 91 and in turn be supported by several studs, such as a stud 110 along with suitable spacers, if desired, to properly support and space the layers of screening 107. The inside curvature at the lower ends of the deflector plates 101 and 102 may have a radius of approximately one-fourth inch to deflect air flow at the roots of the fibers.

The purpose of the even flow of air at even temperature at the root of the cones is to cause each forming cone to be identically quenched and to overwhelm room environmental conditions (or to prevent accidental drafts, ad so forth, from causing filament breakage) so as to prevent the same from cooling too rapidly as the fibers are extruded from the bushing, as may be the case with the embodiments illustrated in FIGS. 1 through 5 which do not include the whiffle-tree type manifold. Typically, the air impinging upon the cone roots is approximately 1500° F. or less, and in the case of relatively large filaments from size K (1.25–13.75 microns) to size C (3.75–4.99 microns), the impinging air temperature can be from room temperature to several degrees hotter.

Typical air pressures are one to two p.s.i. where a tubular bushing is used. Where high rates of attenuation, i.e. 20,000 to 50,000 ft. per minute, are involved such as may be the case with the arrangement of FIG. 4a, higher air pressure (e.g. three to five p.s.i.) generally will be desirable.

Through the use of simple orifices which are spaced closer than one drop diameter, i.e. such that issuing droplets would contact one another, a flooding condition immediately follows. Instead of pulling, for example 204 fibers from a 204 hole bushing, only one or just a few filaments can be pulled from this large glob of molten glass. However, if the volume of glass being pulled away from the bushing exceeds the volume of glass being fed to the orifices, it is apparent that the glob must disappear into discrete filaments. The present quench system is a temperature and volume controlled air blast approach wherein the air is aimed at the root of the forming fibers. It is not even necessary to continuously supply quench air, and a simple control system readily apparent to those skilled in the art can be provided wherein a button (to control an air source) is depressed to supply quench air and increase the quench effect momentarily to thereby cause a much greater viscosity in the glob than in the issuing glass. This low viscosity fiber being pulled off is many times (well over 204 times) the volume of the glass issuing from the 204 orifices. The flooding glob cleans up, therefore resulting in 204 discreet streams. Through the practice of the concepts of the present invention, it will be apparent that even lower glass pressures can be employed than those described in said aforementioned application entitled Patent No. 3,573,014 in order to achieve separation of fibers.

It will be apparent that the principal concepts of the present invention relate to glass fiber forming in a relatively simple and efficient manner so as to achieve and maintain separation, and this is accomplished through the use of a bushing having small, simple and closely spaced orifices along with a smooth and controlled air flow onto the forming fibers and at a controlled quench rate.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

3,697,241

What is claimed is:

1. A method of extruding glass fibers comprising the steps of:

forcing molten glass under pressure through tiny, simple orifices in a bushing to provide a plurality of fibers in the form of extruding cones, providing an enclosed environment closely contiguous about said extruding cones of fibers, and supplying along said cones a gas of a temperature to maintain said cones in a substantially molten state to increase the length of said cones during attenuation thereof, the temperature of said gas being controlled to decrease from a maximum value at the roots of said cones to a lower value below said root, and said enclosed environment including an enclosure of smoothly diminishing cross section in the direction of extrusion of said cones to increase the speed of said gas flow in the direction of said extruding cones as a function of the distance from the root of said cones.

2. Apparatus for controlling the environment about glass fibers as they are extruded comprising:

bushing means having a plurality of tiny orifices through which molten glass is extruded under pressure in the form of extruding cones, said cones having roots at said bushing means, and means contiguous to said bushing means from which said fibers are extruded, said means including chamber means enclosing at least a portion of said extruding cones commencing near said orifices, said chamber means providing an environment of predetermined temperature about at least a portion of said extruding cones, and means coupled with said chamber means for supplying an even flow of air near the roots of said cones, said chamber means including an elongated chamber and current supply means coupled with said chamber for controlling the temperature of the environmen within said chamber, said temperature being highest near said orifices and thus near the roots of said cones and decreasing to a lower value near the apexes of said cones for increasing the length of the extruding cones during attenuation thereof.

3. Apparatus as in claim 2 wherein said chamber is a resistance heated metallic tube and said chamber means includes means for supplying different amounts of current through respective portions of said tube.

4. Apparatus for controlling the environment about glass fibers as they are extruded comprising:

bushing means having a plurality of tiny orifices through which molten glass is extruded under pressure in the form of extruding cones, said cones having roots at said bushing means, and means contiguous to said bushing means from which said fibers are extruded, said means including chamber means enclosing at least a portion of said extruding cones commencing near said orifices, said chamber means providing an environment of predetermined temperature about at least a portion of said extruding cones, and means coupled with said chamber means for supplying an even flow of air near the roots of said cones, said chamber means including a tube, said tube having an upper end contiguous to said bushing and said upper end being flared to provide a diminishing cross section from the upper end of said tube in the direction of cone extrusion to cause air flow in said tube to increase in speed as a function of the distance from said roots of said cones.

5. Apparatus for controlling the environment about glass fibers as they are extruded comprising:

bushing means having a plurality of tiny orifices through which molten glass is extruded under pressure in the form of extruding cones, said cones having roots at said bushing means, and means contiguous to said bushing means from which said fibers are extruded, said means including chamber means enclosing at least a portion of said extruding cones commencing near said orifices, said chamber means providing an enviromnent of predetermined temperature about at least a portion of said extruding cones, and means coupled with said chamber means for supplying an even flow of air near the roots of said cones, said chamber means including a tube, and said tube having an upper end contiguous to said bushing, and said means for supplying an even flow of air includes pressure means coupled toward a lower end of said tube for causing air to be drawn through said tube from said upper end thereof.

6. Apparatus for controlling the environment about glass fibers as they are extruded comprising:

bushing means having a plurality of tiny orifices through which molten glass is extruded under pressure in the form of extruding cones, said cones having roots at said bushing means, and means contiguous to said bushing means from which said fibers are extruded, said means including chamber means enclosing at least a portion of said extruding cones commencing near said orifices, said chamber means providing an environment of predetermined temperature about at least a portion of said extruding cones, and means coupled with said chamber means for supplying an even flow of air near the roots of said cones, said chamber means comprising manifold means having a passage therein arranged about said extruding cones, and including an air flow chamber in said manifold means having baffle means forming an increasing number of air paths in the direction of air flow in said air chamber for dispersing air flowing in said chamber means and providing an even flow of air at the roots of said cones.

7. Apparatus as in claim 2 wherein said chamber is a tube, and a winding of resistance wire is provided about said tube to heat said tube in zones of decreasing temperature from the portion thereof near the roots of said cones.

8. Apparatus as in claim 4 wherein said chamber means includes an air inlet manifold coupled with the upper end of said tube, said manifold encircling the upper end of said tube to provide a radially inwardly flow of air into the upper end of said tube and toward the roots of said cones.

9. Apparatus for controlling the environment about glass fibers as they are extruded comprising:

bushing means having a plurality of orifices through which molten glass is extruded in the form of extruding cones, said cones having roots at said bushing means, means contiguous to said bushing means from which said fibers are extruded, said means including chamber means about said extruding cones at least near the roots thereof, said chamber means providing a controlled environment about at least a portion of said extruding cones, and said chamber means comprising manifold means having a passage therein arranged about said extruding cones, and including an air flow chamber therein having an increasing number of air paths in the direction of air flow in said air chamber for dispersing air flowing in said chamber means and providing an even flow of air at the roots of said cones, and said manifold means comprising a core having a passage therein through which said extruding cones pass and a plurality of peripheral slotted rings, and a jacket mounted about said core to form between said core and jacket said air flow chamber having an increasing number of air paths.

10. Apparatus for controlling the environment about glass fibers as they are extruded comprising:

bushing means having a plurality of orifices through which molten glass is extruded in the form of extruding cones, said cones having roots at said bushing means, and manifold means contiguous to said bushing means, said manifold means including a chamber about said extruding cones at least near the roots thereof, said chamber providing an even flow of air at a controlled temperature at the roots of said cones, said manifold means including a body and baffles providing an air flow chamber having an increasing number of air paths in the direction of air flow through said chamber, said direction of air flow being from the exterior of said manifold means to the roots of said cones.

11. Apparatus as in claim 10 wherein said manifold means comprises a core having a passage therein through which said extruding cones pass and said baffles are in the form of a plurality of slotted rings on the periphery of said core, and a jacket mounted about said core and rings to form between said core and jacket said air flow chamber having an increasing number of air paths, the downstream end of said air flow chamber being contiguous to the orifice area of said bushing means.

12. Apparatus as in claim 10 wherein said manifold means includes an enclosure having said baffles therein, said baffles providing an increasing number of openings and thus an increasing number of air paths in the direction of air flow in said air chamber, said manifold means including deflector means at the downstream end of said air flow chamber for deflecting a smooth and even flow of air at the roots of said cones.

13. Apparatus as in claim 9 wherein sleeve means are coupled with said jacket to provide a heating air passageway about said jacket for heating the air in said air flow chamber.

14. Apparatus for controlling the environment about glass fibers as they are extruded comprising:

bushing means having a plurality of orifices through which molten glass is extruded in the form of extruding cones, said cones having roots at said bushing means, means contiguous to said bushing means from which said fibers are extruded, said means including chamber means about said extruding cones at least near the roots thereof, said chamber means providing a controlled environment about at least a portion of said extruding cones, and said chamber means comprising manifold means having a passage therein arranged about said extruding cones and including an air flow chamber therein having an increasing number of air paths in the direction of air flow in said air chamber for dispersing air flowing in said chamber means and providing an even flow of air at the roots of said cones, and said manifold means comprising an enclosure having baffle members therein, said baffle members having openings to provide said air flow chamber, downstream baffle members having an increasing number of openings for providing said increasing number of air paths and dispersion of downstream air, and downstream deflector means for deflecting an even flow of air at the roots of said cones.

References Cited

UNITED STATES PATENTS

| | | | |
|---|---|---|---|
| 2,566,252 | 8/1951 | Tooley et al. | 65—11 W UX |
| 3,304,163 | 2/1967 | Holschlag | 65—1 X |
| 3,446,149 | 5/1969 | Amos et al. | 65—2 UX |

FOREIGN PATENTS

| | | | |
|---|---|---|---|
| 1,000,137 | 10/1958 | France | 65—1 |

S. LEON BASHORE, Primary Examiner

R. L. LINDSAY, JR., Assistant Examiner

U.S. Cl. X.R.

65—11 W, 12

UNITED STATES PATENT OFFICE
CERTIFICATE OF CORRECTION

Patent No. 3,697,241　　　　　　　　　　Dated  October 10, 1972

Inventor(s) E. T. Strickland et al

It is certified that error appears in the above-identified patent and that said Letters Patent are hereby corrected as shown below:

Column 4, line 57, "fibers" should read --fiber--. Column 6, line 7, "verses" should read --versus--. Column 7, line 2, the comma "," should read a period --.--. Column 8, line 7, cancel the period "." after name. Column 9, line 12, "non" should read --nine--. Column 10, line 6, "insulating" should read --insulation--. Column 10, line 17, "ad" should read --and--. Column 10, line 58, cancel "aforementioned application entitled". Column 11, line 38, "environmen" should read --environment--.

Signed and sealed this 30th day of April 1974.

(SEAL)
Attest:

EDWARD M.FLETCHER,JR.　　　　　　　　　　C. MARSHALL DANN
Attesting Officer　　　　　　　　　　　　Commissioner of Patents